Oct. 1, 1940.     J. E. ARGUE     2,216,307
DENTAL CONTOURLATOR
Filed Dec. 1, 1938     2 Sheets-Sheet 1
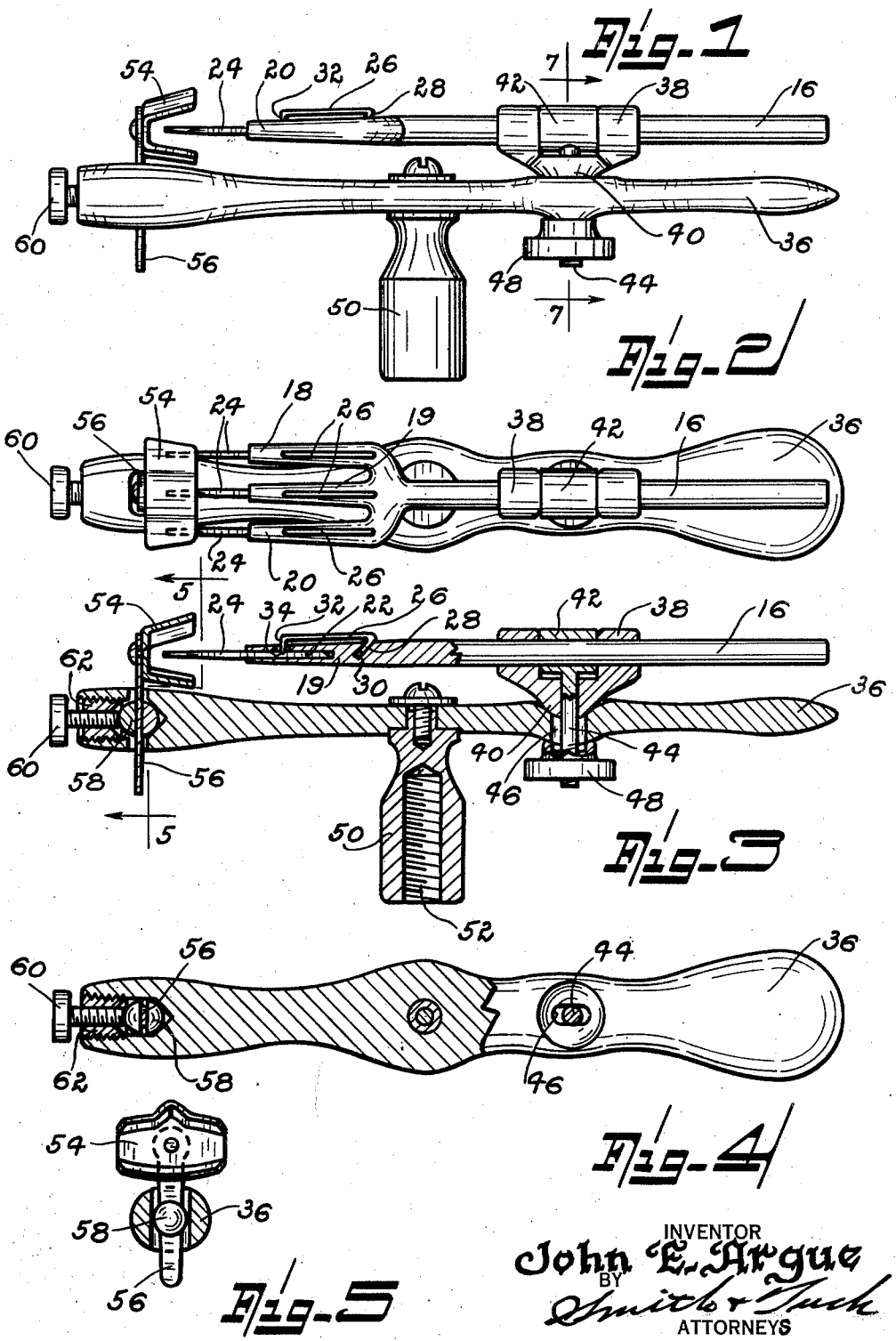

Oct. 1, 1940.   J. E. ARGUE   2,216,307
DENTAL CONTOURLATOR
Filed Dec. 1, 1938   2 Sheets-Sheet 2
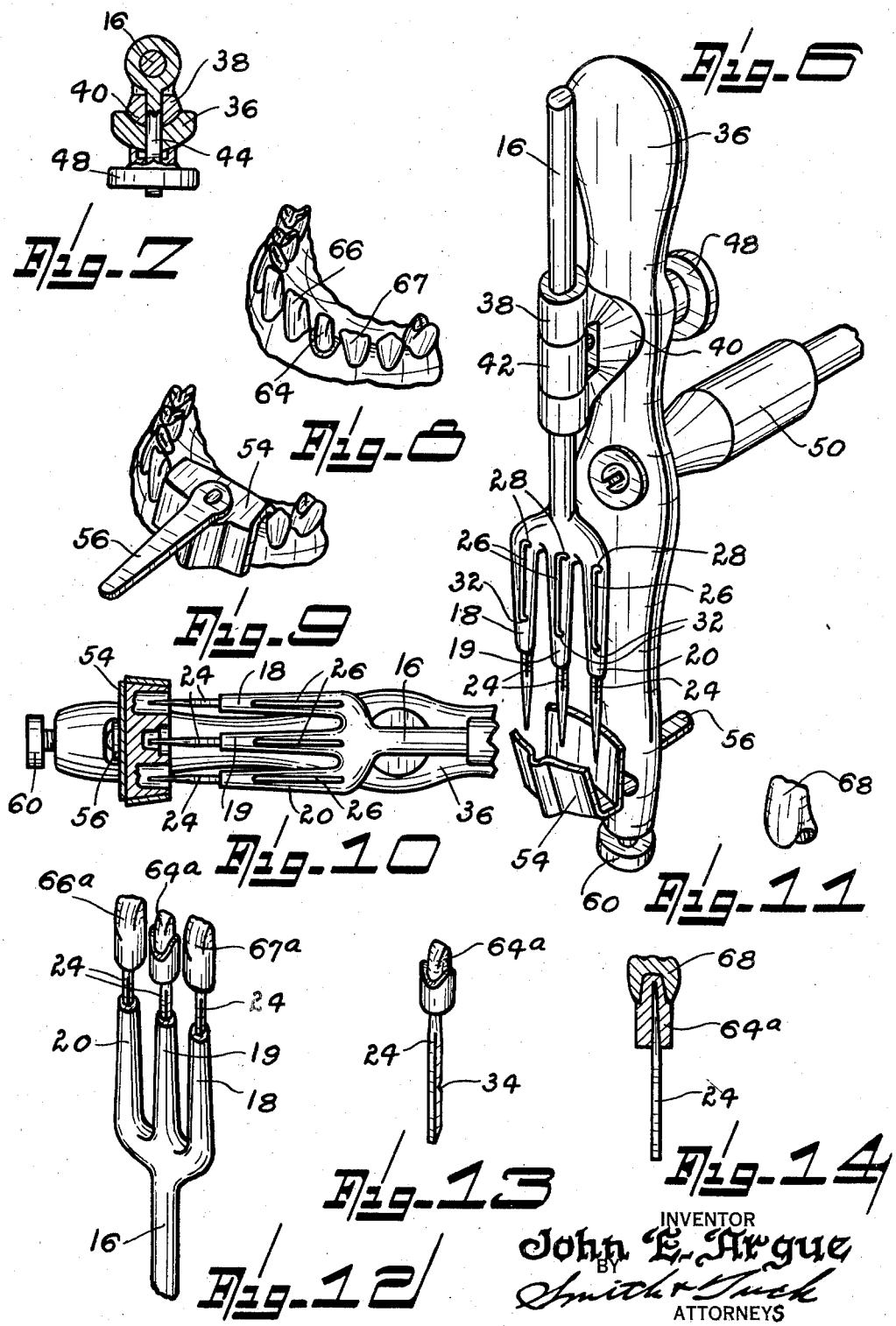
INVENTOR
John E. Argue
BY
Smith & Tuck
ATTORNEYS Patented Oct. 1, 1940

2,216,307

UNITED STATES PATENT OFFICE 2,216,307

DENTAL CONTOURLATOR

John E. Argue, Seattle, Wash.

Application December 1, 1938, Serial No. 243,457

6 Claims. (Cl. 32—67)

My present invention relates to the art of dental equipment and more particularly to a dental contourlator.

My invention consists essentially of a shaft-like, preferably metal, handle which branches into three socket ends so that square wire can be set into and held to place by a wire spring in each socket. This permits of providing means which will enable a dentist to build up a porcelain jacket crown with the two adjoining teeth also impaled upon the branches in the position they will assume in the mouth; to effect this purpose certain additional equipment is required.

The principal object of my invention is to provide an instrument adapted to hold three square, or otherwise deformed, wires in position during the period that models are made of the tooth in question and the two adjacent teeth.

Another important object of my invention is to hold all three models in correct anatomical relation so that when building up the porcelain body for a porcelain jacket crown, the exact contour of the crown can be made and studied in comparison with the approximating teeth.

A further object of my present invention is to provide means whereby the impression of three teeth may be held in correct relation to each other during the entire operation of centrifuging, building up cement models, and the final finishing of the tooth.

A further object is to supply means permitting completion of porcelain jacket crown with the minimum wastage of the patient's time.

Other and more specific objects will be apparent from the following description taken in connection with the accompanying drawings, wherein—

Figure 1 is a side elevation of my device together with associated equipment in the relationship assumed when in use.

Figure 2 is a top plan view of the equipment shown in Figure 1.

Figure 3 is a view taken in the same sense as Figure 1 but shown in section as though cut upon its longitudinal axis.

Figure 4 is a plan view, partly in section, of the centrifuge bar used with my equipment.

Figure 5 is a cross-sectional view taken along the line 5—5 of Figure 3.

Figure 6 is a perspective view showing my contourlator in position on the centrifuge bar, in the normal position of use.

Figure 7 is a cross-sectional view taken along the line 7—7 of Figure 1.

Figure 8 is a perspective view showing a typical set of teeth, in part, and showing the method of dressing a tooth preparatory to building a porcelain jacket crown therefor.

Figure 9 is a perspective view of the same set of teeth showing the small impression tray used normally to make the impressions of the tooth being crowned and the two adjoining teeth.

Figure 10 is a fragmentary plan view showing the impression tray and material in section, to better illustrate the method of making the impression of the teeth through the use of my device.

Figure 11 is a perspective view showing the appearance of a porcelain jacket crown such as is produced with the assistance of my device.

Figure 12 is a perspective view showing the three models of the tooth group in correct anatomical relationship with the tooth shown in the center thereof for which the porcelain jacket crown is being made, the view being intended to illustrate the ease with which comparisons can be made during the building up process.

Figure 13 is a perspective view of the tooth for which the crown is being made.

Figure 14 shows the porcelain crown fitted to the model tooth.

Referring to the drawings, throughout which like reference characters indicate like parts, 16 designates the handle of my device. This I prefer to form normally of round material to the end that it can be readily adjusted and clamped in the desired position. At one end I form my device with a plurality of branches as 18, 19, and 20. Normally three branches are provided, although it is believed it will be apparent that for special cases involving the tapping of two or more teeth, the number of prongs or branches might be increased to the number desired. Each branch is provided with an axially arranged hole 22 which is adapted to receive, preferably, squared wire points as 24. These square wires may be of any desired size; however, 14 guage wire has been found to be very satisfactory for normal use. Each prong is also provided with a clamping means for wire point 24; one convenient clamp means is illustrated in the various views probably best in Figure 3 wherein a spring wire securing means 26 lies on the surface at each prong with an inclined end portion 28 adapted to fit into a receiving socket 30 of the prong. At its other end spring 26 is provided with an inwardly directed bent end at 32 which passes through an opening in the prong so as to engage and rest on point 24. In order to make this clamping action more secure I provide, preferably, a notch as 34 in point 24 so that the locking members can seat in this notch and thus form a definite key lock.

As one step in my operation requires that the contourlator secure model teeth in position during their centrifuging operation, I have provided a clamp means to secure my device to the centrifuge bar 36. This means consists of a bifurcated guide member at 38 which seats into handle, or bar, 36 on a ball seat at 40. This permits ready adjustment of this member so that the proper positioning of the contourlator may be effected. Clamping is accomplished by providing intermediate the guide members of 38 a lock member 42. This is provided with a bearing portion that encircles rod 16 and then has a threaded bolt like portion 44 which extends down through the enlarged opening 46 in handle 36 and finally a nut 48 is threaded onto this extension. Nut 48 also provides a ball seat on handle 36. This is accomplished by having the female portion of the ball joint formed in the large diameter hub of nut 48 with the male portion of the ball formed as part of handle 36. In this manner because of the relatively large opening at 46 the clamp means is capable of limited angular adjustment so that the contourlator may be positioned as desired within certain limits.

The centrifuge bar is provided with the usual socket at 50 which may be threaded as shown at 52 or by any other means secured to the centrifuge shaft.

At its extreme opposite end the centrifuge bar 36 is provided with means for holding in position the small impression tray 54. This tray is normally made sufficiently large to hold three tooth impressions. It will be apparent, of course, that for certain purposes it may be made larger but usually porcelain jacket crowns are made for individual teeth and three is the normal practice. Tooth tray 54 is secured to the handle 56. This may normally be pivoted to the tray or may be set to any predetermined angle. It should have sufficient extent, however, so that as it is being clamped in position it may be moved up or down so as to better position the tray with respect to the contourlator. The clamping means is provided by having a perforated ball or a split ball at 58 and then to provide a clamp screw 60. Each portion of ball 58 comes to a, preferably, coned seat or, in case of screw 60, to a point seat so that the tray may be tipped and swung through reasonable limits to further assist in its accurate positioning. In order to assist in the construction of this joint I prefer to provide a bushing or plug 62 so that the ball element or elements may be easily seated in their final position but will be secure in that position against being locked.

Method of operation

In using my contourlator the first operation normally is to dress the tooth for which a porcelain jacket crown is to be made. This is illustrated in Figure 8, the tooth in question being shown at 64. The small impression tray 54 with suitable impression material is employed after the showing of Figure 9 to obtain an impression of tooth 64 and the adjoining teeth 66 and 67. This impression is then mounted on centrifuge bar 36 after the showing of Figures 1, 2, 3, and 10, and the cement models of the teeth are produced by mixing dental cement to a plastic state and then centrifuging this into the especially prepared impressions of the three teeth as described. Prior to the placement of the cement, however, my contourlator is put in position as is illustrated in the various views and particularly in Figure 10.

The extreme end of the wires which are to be incorporated in the cement models when run up, are pointed. The three wires are placed in the contourlator which is now also fitted into the adjustable stanchion on the centrifuge bar, in conjunction with the impression tray, the points set down into the tray, each into the impression of one of the three teeth and should be adjusted so that when the cement is run up, the wire will be about the middle of the cement model.

In this manner when the cement is centrifuged into place, and the cement is given time to crystallize, the impression may be removed from the cement model teeth, the excess at the base of the models trimmed off, and the resultant form is as shown in Figure 12. Here the dentist has before him a model of the dressed tooth, and a model of each of the adjoining teeth just as they appear in the patient's mouth due to the fact that my contourlator, following the method outlined, reproduces the relative positions of these teeth and holds them in a position as they actually appear in the mouth. In Figure 12 the model tooth is indicated at 64a and the adjoining teeth as 66a and 67a.

The dressed tooth 64a is wrapped with platinum plate 1/750 of an inch in thickness and the porcelain in a plastic state is built up on the platinum covered model; next, the porcelain crown with the underlying platinum is removed from the cement tooth and fired; the cavity is thus enlarged by the platinum plate an amount over the patient's tooth sufficient to accommodate the necessary cement.

During the trimming operations and the building up of the porcelain jacket crown or model 64a each of the various points may be removed by merely raising up on spring 26 so that the end comes out of engagement with notch 34. In this manner the tooth on its point can be removed from the contourlator, placed in a suitable handle, and is then in a convenient form upon which to work, or for comparison from time to time during the building up of the crown.

The cement model, with the matrix on, may be placed in the contourlator, together with the cement models of the mesial and distal teeth, which holds and supports all three teeth, in a definite anatomical approximation and alinement so that the porcelain when built up, the contour, contacts and alinement can be correctly made, in order that the exact tooth form in a general way, can be outlined when building the first bake of porcelain.

In Figure 14 I have shown the porcelain jacket 68 as completed on the model tooth 64a. This is also shown in perspective in Figure 11. It will now be apparent that the crown, having been built up and formed after proper treatment, is then ready to be placed upon the patient's tooth 64 and should fit the same accurately inasmuch as the model tooth 64a is an exact reproduction of the same. Further, owing to the fact that the dentist has had the models of the two adjacent teeth before him at all times, he can visualize in advance just how this crown is going to match up with the natural teeth in form and length and can make such modification in the crown that will properly and satisfactorily match those teeth without infringing unnecessarily on the patient's time.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

Having thus fully described my invention, what I claim as new and desire to secure by Letters Patent is:

1. In a dental instrument for determining the contour of an artificial crown, the combination with a centrifuge-bar, of a matrix and means for adjustably mounting said matrix on the bar, a handle coplanar with the bar and means for mounting said handle on the bar, said handle having a head, and a plurality of detachable pins mounted in said head with their free ends located in complementary pockets of the matrix.

2. In a dental instrument for determining the contour of an artificial crown, the combination with a centrifuge bar, of a matrix, means for adjustably mounting said matrix on the bar, a coplanar handle and adjustable means for mounting said handle on the bar, a trident-shaped head rigid with the handle, three detachable pins mounted in the head, three spring catches mounted on the head and co-acting with said pins, and the free ends of said pins being located in complementary pockets in said matrix.

3. In a dental instrument, the combination with a centrifuge bar, a matrix-tray having a stem, and adjustable means for mounting said matrix-tray on the bar, of a handle, adjustable means for mounting said handle on the bar, a head rigid with the handle, and a plurality of detachable pins mounted in said head with their free ends located in spaced pockets in the matrix-tray.

4. In a dental instrument, the combination with a supporting bar, a matrix-tray having a stem, and adjustable means for mounting said matrix-tray on the bar, of a handle having a rigid trident-shaped head, means for adjustably mounting said handle on the bar, three detachable pins mounted in said head with their free ends located in spaced pockets of the matrix-tray, and three spring-catches mounted on the head for co-action with said pins.

5. In a dental instrument for determining the contour of an artificial crown, the combination with a supporting bar, a matrix, and adjustable means for mounting said matrix on the bar, of a bearing-yoke mounted on the supporting bar, a handle having a bearing in said yoke, means for clamping said yoke rigid with the bar, a head rigid with the handle, and a plurality of detachable pins mounted in the head having their free ends located in spaced pockets of the matrix.

6. In a dental instrument for determining the contour of an artificial crown, the combination with a supporting bar, a matrix and adjustable means for mounting said matrix on the bar, of a bearing-yoke having a hemispherical bearing on said bar, a handle mounted in said bearing-yoke, a clamping bolt mounted in the bar and extending transversely therethrough, a handle mounted in the bearing yoke, a sleeve on said bolt surrounding the handle, a clamping-nut on the threaded end of the bolt, a head on the handle, and a plurality of detachable pins mounted on said head with their free ends located in pockets of the matrix.

JOHN E. ARGUE.